United States Patent
Mori

(10) Patent No.: US 11,289,775 B2
(45) Date of Patent: Mar. 29, 2022

(54) BATTERY WIRING MODULE INCLUDING ELASTIC JOINERS

(71) Applicant: SUMITOMO WIRING SYSTEMS, LTD., Mie (JP)

(72) Inventor: Ryota Mori, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 356 days.

(21) Appl. No.: 16/539,272

(22) Filed: Aug. 13, 2019

(65) Prior Publication Data

US 2020/0075916 A1    Mar. 5, 2020

(30) Foreign Application Priority Data

Aug. 29, 2018 (JP) .............................. JP2018-160508

(51) Int. Cl.
| | |
|---|---|
| *H01M 50/502* | (2021.01) |
| *H01M 50/20* | (2021.01) |
| *H01M 50/507* | (2021.01) |
| *H01M 50/503* | (2021.01) |
| *H01M 50/204* | (2021.01) |
| *H01M 50/517* | (2021.01) |

(52) U.S. Cl.
CPC ......... *H01M 50/502* (2021.01); *H01M 50/20* (2021.01); *H01M 50/204* (2021.01); *H01M 50/503* (2021.01); *H01M 50/507* (2021.01); *H01M 50/517* (2021.01); *H01M 2220/20* (2013.01)

(58) Field of Classification Search
CPC ............... H01M 50/502; H01M 50/20; H01M 2220/20; H01M 50/543; H01M 50/572; H01M 50/204; H01M 50/503; H01M 50/507; H01M 50/517; Y02E 60/10
See application file for complete search history.

(56) References Cited

U.S. PATENT DOCUMENTS

2015/0171405 A1* 6/2015 Lee ..................... H01M 50/35
                                                         429/89
2016/0133907 A1   5/2016 Shitamichi et al.

FOREIGN PATENT DOCUMENTS

JP      2015-002164       1/2015
WO   WO 2013/069756    *  5/2013 ............ H01M 50/20

OTHER PUBLICATIONS

Machine translation of WO 2013/069756, Hirai et al., 2013 (Year: 2013).*

* cited by examiner

*Primary Examiner* — Kwang Han
(74) *Attorney, Agent, or Firm* — Greenblum & Bernstein, P.L.C.

(57) ABSTRACT

Provided is a battery wiring module according to which a load that acts on module-side terminals accompanying expansion or contraction of battery cells can be reduced. A housing includes: a wire accommodating portion for accommodating wires; multiple terminal accommodating portions for accommodating module-side terminals; and first elastic joining portions that join the wire accommodating portion and the terminal accommodating portions in an elastically-deformable manner in the direction in which the battery cells are aligned.

7 Claims, 3 Drawing Sheets

BATTERY WIRING MODULE INCLUDING ELASTIC JOINERS

TECHNICAL FIELD

The present invention relates to a battery wiring module.

BACKGROUND ART

For example, as disclosed in JP 2015-2164A, a battery wiring module is attached to a high-voltage secondary battery that is mounted as a power source for travel driving in a vehicle such as an electric automobile or a hybrid automobile. In the battery wiring module, module-side terminals are connected to bus bars that connect the multiple battery cells constituting the secondary battery.

JP 2015-2164A is an example of related art.

SUMMARY OF THE INVENTION

Incidentally, with the above-described battery wiring module, the bus bars and the module-side terminals move accompanying thermal expansion and contraction of the multiple battery cells. At this time, if the positions of the terminal accommodating portions accommodating the module-side terminals are fixed, the module-side terminals move relative to the terminal accommodating portions. Accordingly, there is a risk that a load will be applied to the module-side terminals.

The present invention has been achieved to solve the above-described problem, and it is an object thereof to provide a battery wiring module that can reduce a load that acts on a module-side terminal accompanying expansion and contraction of a battery cell.

A battery wiring module for solving the above-described problem is a battery wiring module including: module-side terminals that are electrically connected to bus bars connecting battery terminals of a plurality of battery cells; wires with ends on one side connected to the module-side terminals; and a housing for accommodating the wires and the module-side terminals, wherein the housing includes: a wire accommodating portion for accommodating the wires; a plurality of terminal accommodating portions for accommodating the module-side terminals; and first elastic joining portions joining the wire accommodating portion and the terminal accommodating portions in a direction in which the battery cells are aligned, in an elastically-deformable manner.

According to the above-described aspect, the wire accommodating portion and the terminal accommodating portions are joined by the first elastic joining portions in the direction in which the battery cells are aligned, in an elastically-deformable manner, and thus even if the battery cells expand and contract, the displacement can be absorbed by the elastic deformation of the first elastic joining portions. That is, when the module-side terminals connected to the bus bars comply with the expansion or contraction of the battery cells, the terminal accommodating portions can comply with the expansion or contraction due to the elastic deformation of the first elastic joining portions. Accordingly, the load applied to the module-side terminals can be suppressed.

The above-described battery wiring module preferably includes second elastic joining portions joining the terminal accommodating portions that are adjacent to each other in the direction in which the battery cells are aligned, in an elastically-deformable manner.

According to the above-described aspect, the terminal accommodating portions that are adjacent to each other in the direction in which the battery cells are aligned are joined by the second elastic joining portions in an elastically-deformable manner, and thus even if the battery cells expand or contract, the displacement can be absorbed by the elastic deformation of the second elastic joining portions. That is, the module-side terminals connected to the bus bars comply with the bus bars to which they are connected, accompanying the expansion or contraction of the battery cells. At this time, although the module-side terminals move toward or away from each other in some cases, the terminal accommodating portions can comply due to the terminal accommodating portions being joined by the second elastic joining portions in an elastically-deformable manner as described above. Accordingly, the load applied to the module-side terminals can be suppressed.

In the above-described battery wiring module, it is preferable that the housing includes blocking wall portions that each block at least one of a gap between the wire accommodating portion and a terminal accommodating portion and a gap between terminal accommodating portions that are adjacent to each other in the direction in which the battery cells are aligned.

According to the above-described aspect, the blocking wall portions are each included in at least one of a gap between the wire accommodating portion and a terminal accommodating portion and a gap between terminal accommodating portions that are adjacent to each other in the direction in which the battery cells are aligned, and thus spatter, which occurs when performing welding of the connection between the module-side terminal and the bus bar or the connection between the bus bar and the battery terminal, is suppressed from flying into the gap.

In the above-described battery wiring module, it is preferable that the second elastic joining portions also serve as the blocking wall portions for blocking the gaps between the terminal accommodating portions that are adjacent to each other in the direction in which the battery cells are aligned.

According to the above-described aspect, by using a configuration in which the second elastic joining portions also serve as the blocking wall portions, the second elastic joining portions and the blocking wall portions are suppressed from being included separately.

In the above-described battery wiring module, it is preferable that the wire accommodating portion includes a plurality of recesses that are recessed in a direction that is orthogonal to the direction in which the plurality of battery cells are aligned, and that is orthogonal to a direction of stacking the housing on the battery cells, and the terminal accommodating portions are included in the recesses.

According to the above-described aspect, by including the terminal accommodating portions in the recessed portions, it is possible to prevent an increase in size of the battery wiring module caused by the terminal accommodating portions.

According to the battery wiring module of the present invention, the load that acts on the module-side terminals accompanying the expansion or contraction of the battery cells can be reduced.

EMBODIMENTS OF THE INVENTION

Figure 1:
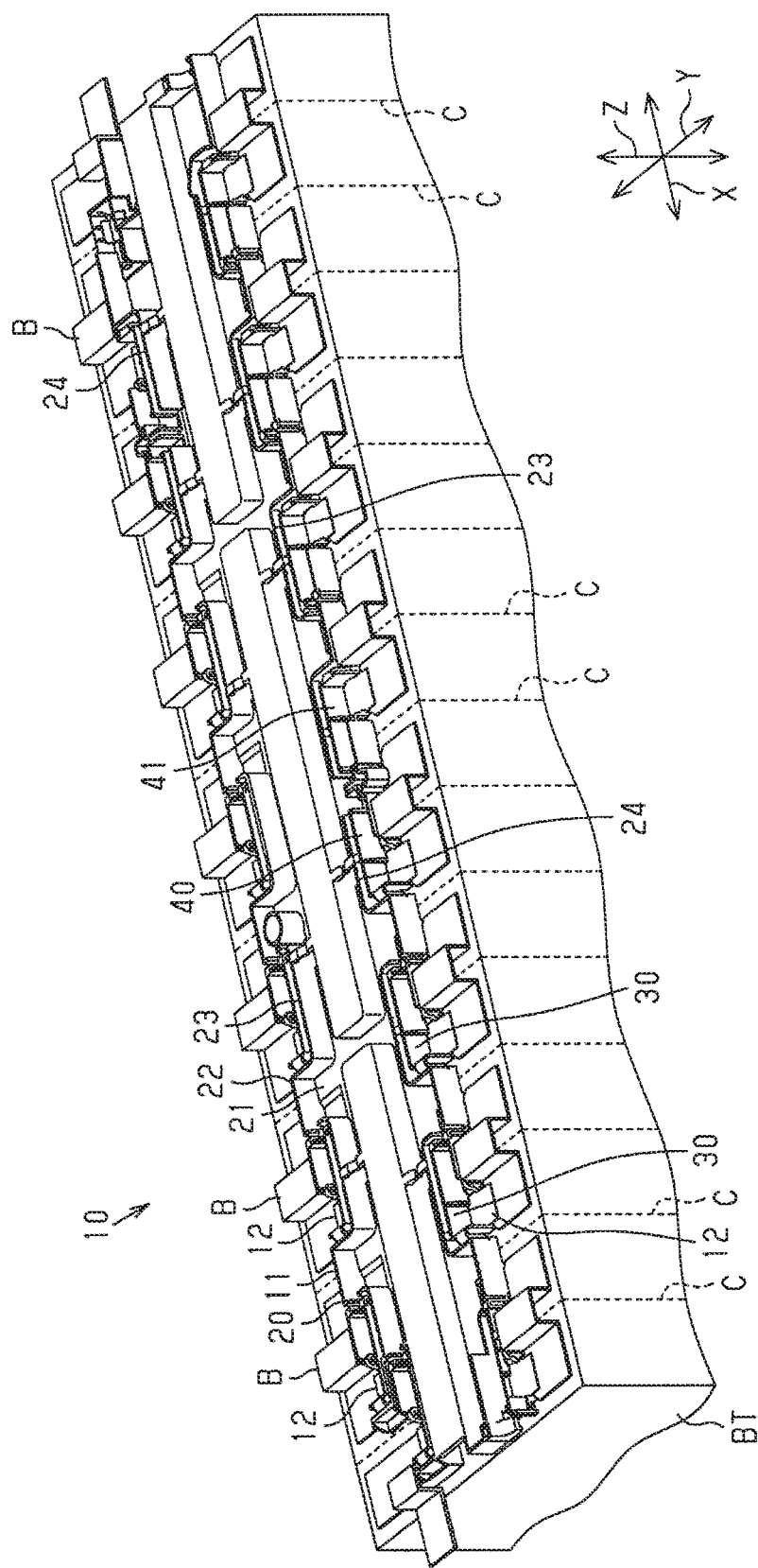
FIG. 1 is a perspective view of a battery wiring module according to an embodiment.

Description of Embodiments of the Present Invention

Hereinafter, an embodiment of a battery wiring module will be described. Note that in the drawings, parts of configurations are shown exaggerated or simplified in some cases for convenience in the description. Dimensional proportions of the portions are also different from the actual dimensional proportions in some cases.

As shown in FIG. 1, the battery wiring module 10 is mounted on the upper surface of an approximately cuboid-shaped secondary battery BT. Note that the secondary battery BT is mounted in an electric automobile, a hybrid automobile, or the like, and supplies power to a travel motor of the vehicle. Also, the secondary battery BT receives a supply of power from the travel motor or the power generation motor according to the charge state or the driving state of the vehicle. Here, in the following description, among the three directions that are orthogonal to each other in FIG. 1, the X direction is the direction in which the battery cells are aligned, the Y direction is the width direction of the battery wiring module, and the Z direction is the up-down direction.

The secondary battery BT includes multiple battery cells C, and cathode terminals and anode terminals (not shown) of the battery cells C face the battery wiring module 10 (upward).

The multiple battery cells C are arranged aligned in the X direction. At this time, the battery cells C are aligned such that cathode terminals and anode terminals serving as battery terminals are alternatingly switched in the direction in which the battery cells C are aligned, that is, the X direction. The terminals are provided with bus bars B that connect the adjacent terminals, that is, the cathode terminals and the anode terminals. That is, the battery cells C are connected in series by the bus bars B. The bus bars B of the present example are connected through welding to the cathode terminals and the anode terminals of the battery cells C, for example.

Figure 3:
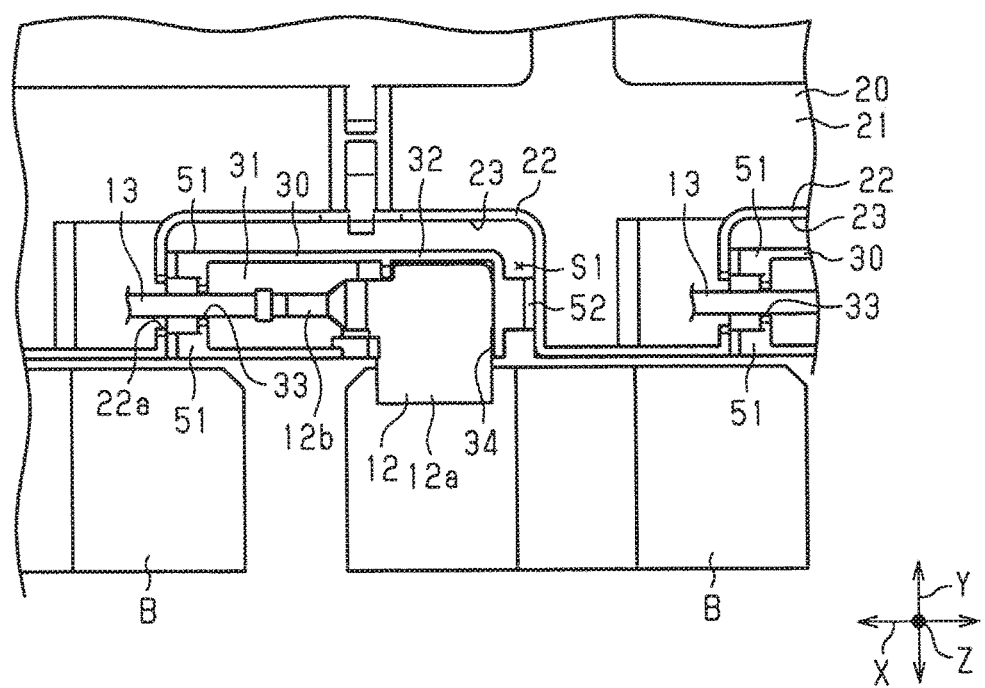
FIG. 3 is a top view showing a portion of the battery wiring module according to the embodiment.

As shown in FIG. 1, the battery wiring module 10 includes: a housing 11; multiple module-side terminals 12; and multiple wires 13 (see FIG. 3).

The housing 11 has a shape whose dimension in the X direction, which is the direction in which the battery cells C are aligned, is longer than its dimension in the Y direction, which is the width direction, for example. The housing 11 has a shape with an opening formed on its upper side, and the opening is closed by a cover (not shown).

The housing 11 is constituted by a resin member, for example. The housing 11 includes: a wire accommodating portion 20 for accommodating wires; and terminal accommodating portions 30, 40, and 41 for accommodating the module-side terminals 12.

Figure 5:
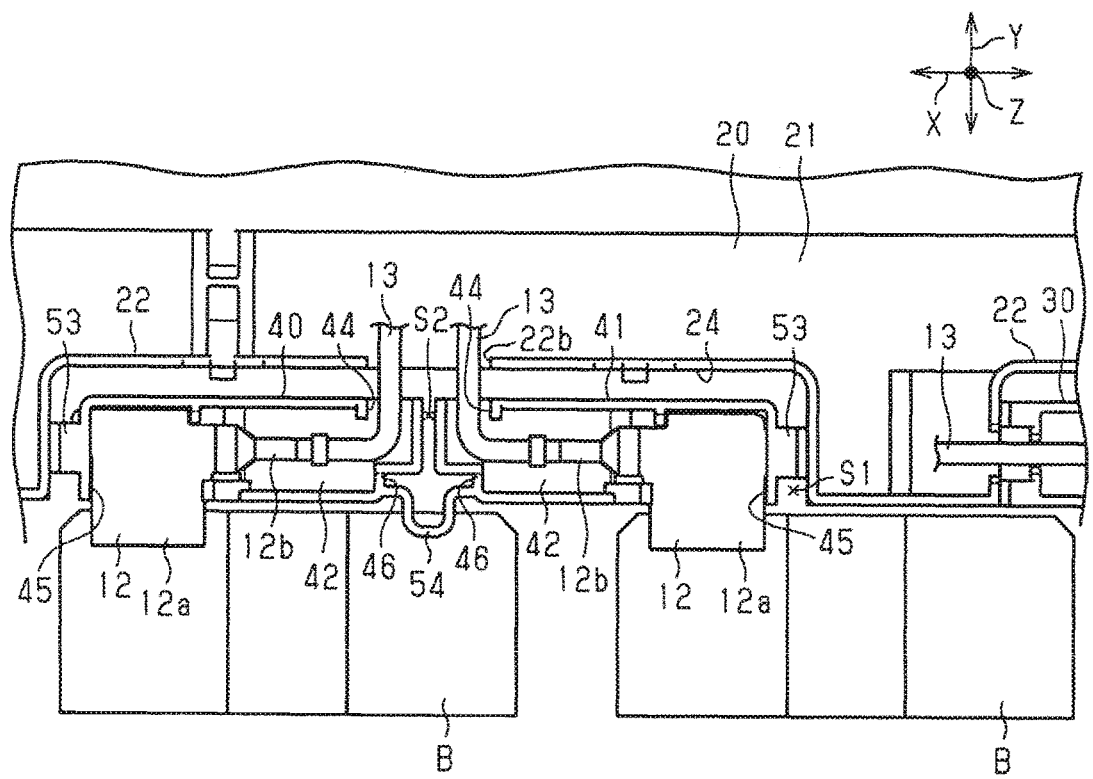
FIG. 5 is a top view showing a portion of the battery wiring module according to the embodiment.

As shown in FIGS. 3 and 5, the module-side terminals 12 each include: a flat plate-shaped terminal main body 12a; and a barrel portion 12b that is continuous with the terminal main body 12a. The barrel portion 12b is electrically connected to a core wire of a wire 13.

As shown in FIGS. 1 to 5, the wire accommodating portion 20 of the housing 11 is demarcated in the housing 11 by a bottom portion 21 and side walls 22 that extend from the outer edge portions of the bottom portion 21. In the direction in which the multiple battery cells C are aligned, the wire accommodating portion 20 includes multiple recesses 23 and 24 that are recessed in a direction that is orthogonal to the direction in which the multiple battery cells C are aligned and that is orthogonal to the direction of stacking the housing 11 on the battery cells C, that is, the Y direction. One terminal accommodating portion 30 is provided in each recess 23. Two terminal accommodating portions 40 and 41 are provided in each recess 24.

Figure 2:
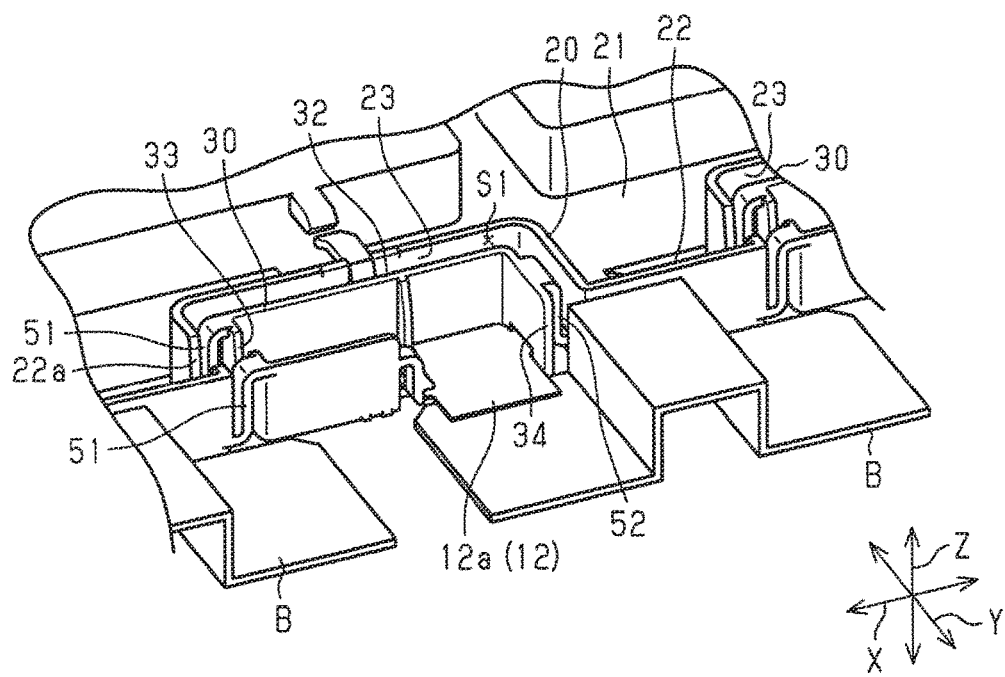
FIG. 2 is a perspective view of a portion of the battery wiring module according to the embodiment.

As shown in FIGS. 2 and 3, the terminal accommodating portions 30 of the housing 11 are demarcated in the housing 11 by bottom portions 31 and side walls 32 that extend from the outer edge portions of the bottom portions 31. The terminal accommodating portions 30 are formed so as to have approximately cuboid shapes that are longer in the X direction. The recesses 23 of the terminal accommodating portions 30 and the wire accommodating portion 20 are provided with gaps S1 on both sides in the X direction and one side in the Y direction of the terminal accommodating portions 30. Also, the side walls 32 of the terminal accommodating portions 30 each include: an opening portion 33 that is open in the X direction; and an opening portion 34 that is open in the Y direction orthogonal to the X direction.

As shown in FIGS. 2 and 3, in the X direction, the opening portion 33 that is open in the X direction of the terminal accommodating portion 30 opposes an opening portion 22a that is formed so as to be open on the side wall 22 of the wire accommodating portion 20. For this reason, the wire 13 connected to the module-side terminal 12 accommodated in the terminal accommodating portion 30 can be guided into the wire accommodating portion 20 using the opening portion 33 of the terminal accommodating portion 30 and the opening portion 22a of the wire accommodating portion 20. That is, the opening portion 33 of the terminal accommodating portion 30 and the opening portion 22a of the wire accommodating portion 20 function as openings for guiding (inserting) the wire 13.

As shown in FIGS. 2 and 3, the opening portion 34 is open to the outside (the side opposite to that of the wire accommodating portion 20) in the Y direction. The opening portion 34 can expose part of the terminal main body 12a of the module-side terminal 12 accommodated in the terminal accommodating portion 30 to the outside in the Y direction. The exposed portion of the terminal main body 12a that is partially exposed from the opening portion 34 is electrically connected to the bus bar B.

As shown in FIGS. 2 and 3, first elastic joining portions 51 and 52 are included between the wire accommodating portion 20 and the terminal accommodating portion 30. The first elastic joining portions 51 and 52 are provided on both sides in the X direction of the terminal accommodating portion 30, with the terminal accommodating portion 30 interposed therebetween. The two first elastic joining portions 51 are provided on both sides in the Y direction of the opening portion 33 on the opening portion 33 side, which is one side in the X direction of the terminal accommodating portion 30. One first elastic joining portion 52 is provided on the other side in the X direction of the terminal accommodating portion 30. The first elastic joining portions 51 and 52 are formed so as to have an approximate S shape in a view from the Y direction. Accordingly, the first elastic joining portions 51 and 52 more easily elastically deform in the X direction. In the present embodiment, the first elastic joining portion 51 connects the lower portions of the side walls 22 on both sides of the opening portion 22a of the wire accommodating portion 20 and the upper portions of the side walls 32 on both sides of the opening portion 33 of the terminal accommodating portion 30. Then, with the first elastic joining portions 51 and 52, if the terminal accommodating portion 30 moves in the Y direction relative to the wire accommodating portion 20, the first elastic joining portions 51 and 52 elastically deform.

Figure 4:
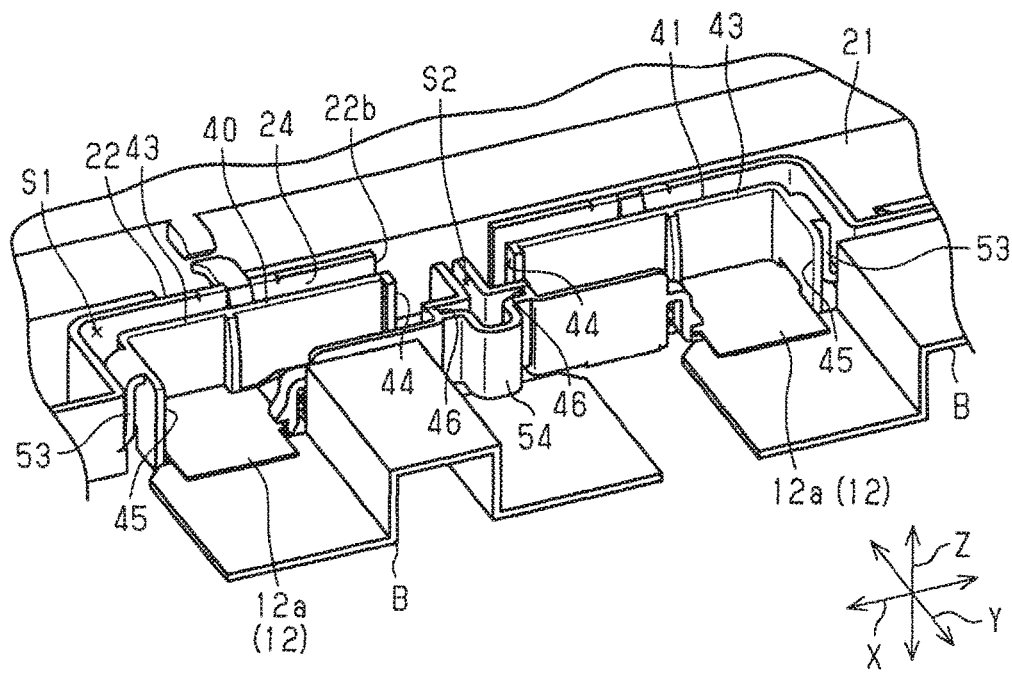
FIG. 4 is a perspective view of a portion of the battery wiring module according to the embodiment.

As shown in FIGS. 4 and 5, the terminal accommodating portions 40 and 41 of the housing 11 are segmented in the housing 11 by a bottom portion 42 and side walls 43 that extend from the outer edge portions of the bottom portion 42. The terminal accommodating portions 40 and 41 are formed so as to have approximate cuboid shapes that are longer in the X direction. The terminal accommodating portions 40 and 41 and the recesses 24 of the wire accommodating portion 20 are provided with gaps S1 on one side in the X direction of the terminal accommodating portion 40, another side in the X direction of the terminal accommodating portion 41, and one side in the Y direction of the terminal accommodating portions 40 and 41. Also, the side walls 43 of the terminal accommodating portions 40 and 41 include opening portions 44 that are open to the wire accommodating portion 20 in the Y direction and opening portions 45 that are open to the side opposite to that of the wire accommodating portion 20 in the Y direction.

The opening portions of the terminal accommodating portions 40 and 41 oppose, in the Y direction, the opening portion 22b that is formed so as to be open in the side wall 22 of the wire accommodating portion 20. The opening portion 22b is formed so as to open to the outside in the Y direction and is formed in the approximate center in the X direction of the recess 24. The wires 13 connected to the module-side terminals 12 accommodated in the terminal accommodating portions 40 and 41 can be guided into the wire accommodating portion 20 using the opening portion 44 of the terminal accommodating portions 40 and 41 and the opening portion 22b of the wire accommodating portion 20. That is, the opening portions 44 of the terminal accommodating portions 40 and 41 and the opening portion 22b of the wire accommodating portion 20 function as openings for guiding (inserting) the wires 13.

The opening portions 45 of the terminal accommodating portions 40 and 41 can expose portions of the terminal main bodies 12a of the module-side terminals 12 accommodated in the terminal accommodating portions 40 and 41 to the outside. The exposed portions of the terminal main bodies 12a that are partially exposed from the opening portions 45 are electrically connected to the bus bars B.

As shown in FIGS. 4 and 5, first elastic joining portions 53 are included between the wire accommodating portion 20 and the terminal accommodating portions 40 and 41. The first elastic joining portions 53 are provided at portions of the terminal accommodating portions 40 and 41 and the wire accommodating portion 20 that oppose each other the X direction. Here, the terminal accommodating portion 40 opposes the wire accommodating portion 20 on one side in the X direction, and the terminal accommodating portion 41 opposes the wire accommodating portion 20 on another side in the X direction.

A second elastic joining portion 54 is included between the terminal accommodating portion 40 and the terminal accommodating portion 41 that are adjacent in the X direction in the recess 24. The second elastic joining portion 54 protrudes from an opposing surface 46 in the X direction of the terminal accommodating portions 40 and 41, for example, and joins the terminal accommodating portions 40 and 41. The second elastic joining portion 54 is formed so as to have a cross section that is approximately U-shaped, and joins the terminal accommodating portions 40 and 41 in an elastically-deformable manner.

The second elastic joining portion 54 extends from the outside in the direction inside of the opposing surface 46, and is formed curved so as to have a U shape on the outside in the Y direction. That is, the second elastic joining portion 54 protrudes outward in the Y direction past the terminal accommodating portions 40 and 41. Also, the second elastic joining portion 54 is located above the bus bar B in the Z direction, which is the up-down direction, and can come into contact with the bus bar B in the Z direction. For this reason, the bus bar B is suppressed from moving upward.

The action of the present embodiment will be described.

The battery wiring module 10 of the present embodiment is arranged on the secondary battery BT, which has multiple battery cells C. The module-side terminals 12 of the battery wiring module 10 are connected to the bus bars B, which connect the cathode terminals and the anode terminals of the battery cells C that are aligned in the X direction. The ends on one side of the wires 13 are connected to the module-side terminals 12, and the ends on the other side of the wires 13 are connected to battery monitoring ECUs (not shown). The battery monitoring ECUs can monitor the voltages of the battery cells C.

Also, the first elastic joining portions 51, 52, and 53 are included between the wire accommodating portion 20 and the terminal accommodating portions 30 of the battery wiring module 10 and between the wire accommodating portion 20 and the terminal accommodating portions 40 and 41, and movement (displacement) accompanying the expansion and contraction operation of the battery cells C is allowed. Furthermore, the second elastic joining portions 54 are included between terminal accommodating portions 40 and 41 that are adjacent to each other in the direction in which the battery cells C are aligned, and movement (displacement) accompanying the expansion and contraction operation of the battery cells C is allowed.

Effects of the present embodiment will be described.

(1) The wire accommodating portion 20 and the terminal accommodating portions 30, 40, and 41 are joined by the first elastic joining portions 51, 52, and 53 in an elastically-deformable manner in the direction in which the battery cells C are aligned, and thus even if the battery cells C expand or contract, the displacement can be absorbed by the elastic deformation of the first elastic joining portions 51, 52, and 53. That is, the terminal accommodating portions 30, 40, and 41 can comply due to the elastic deformation of the first elastic joining portions 51, 52, and 53 when the module-side terminals 12 connected to the bus bars B comply with the expansion and contraction of the battery cells C. Accordingly, the load acting on the module-side terminals 12 can be suppressed.

(2) The terminal accommodating portions 40 and 41 that are adjacent in the direction in which the battery cells C are aligned are joined by the second elastic joining portion 54 in an elastically-deformable manner, and thus even if the battery cells C expand or contract, the displacement can be absorbed by the elastic deformation of the second elastic joining portion 54. That is, the module-side terminals 12 connected to the bus bars B can comply with the bus bars B to which they are connected, accompanying expansion or contraction of the battery cells C. At this time, the module-side terminals 12 move toward or away from each other in some cases, but the terminal accommodating portions 40 and 41 can comply due to the terminal accommodating portions 40 and 41 being joined in an elastically-deformable manner by the second elastic joining portion 54 as described above. Accordingly, the load acting on the module-side terminals 12 can be suppressed.

(3) The second elastic joining portions 54 constituting the blocking wall portions are included in the gaps S2 between the terminal accommodating portions 40 and 41 that are adjacent to each other in the direction in which the battery cells C are aligned, and thus spatter that occurs when performing connection of the module-side terminals 12 and the bus bars B and connection of the bus bars B and the battery terminals through welding is prevented from flying into the gaps S2. Accordingly, spatter is suppressed from flying to the wires 13, and damage to the wires 13 can be suppressed.

(4) By using a configuration in which the second elastic joining portions 54 also serve as blocking wall portions, the second elastic joining portions 54 and the blocking wall portions can be suppressed from being included separately.

(5) By including the terminal accommodating portions 30, 40, and 41 in the recesses 23 and 24, it is possible to suppress an increase in the size of the battery wiring module 10 caused by the terminal accommodating portions 30, 40, and 41.

(6) Since a configuration is used in which the elastic joining portions 51, 52, 53, and 54 are provided in only the terminal accommodating portions 30, 40, and 41, the rigidity of the wire accommodating portion 20 side can be ensured.

(7) The elastic joining portions 51, 52, 53, and 54 have a height (length) equal to that of the side walls 22, 32, and 43, which are adjacent in the up-down direction Z, and therefore it is possible to suppress an increase in size in the up-down direction Z caused by the elastic joining portions 51, 52, 53, and 54.

Note that the above-described embodiment can be implemented with the following modifications. The above-described embodiment and the following modified examples can be implemented in combination with each other as long as there are no technical discrepancies.

In the above-described embodiment, a configuration was employed in which the second elastic joining portions 54 are included between the adjacent terminal accommodating portions 40 and 41, but a configuration may also be employed in which the second elastic joining portions 54 are omitted. In this case, for example, the terminal accommodating portions 40 and 41 that are adjacent to each other may be connected using a rigid body or the terminal accommodating portions 40 and 41 may have an integrated configuration.

In the above-described embodiment, a configuration was used in which the second elastic joining portions 54 are also used if the second elastic joining portions 54 are to block the gaps S2 between the terminal accommodating portions 40 and 41 that are adjacent to each other in the direction in which the battery cells C are aligned, but the blocking wall portions and the second elastic joining portions 54 may also be provided separately.

In the above-described embodiment, although not particularly mentioned, a configuration may also be employed in which the blocking wall portions are provided so as to block the portions of the gaps S1 between the terminal accommodating portions 30, 40, and 41 and the wire accommodating portion 20, the portions facing the bus bars B.

In the above-described embodiment, a configuration was used in which blocking wall portions are included by providing the second elastic joining portions 54, but it is also possible to employ a configuration in which the blocking wall portions are omitted.

In the above-described embodiment, a configuration was used in which the terminal accommodating portions 30, 40, and 41 are provided in the recesses 23 and 4, but there is no limitation thereto.

LIST OF REFERENCE NUMERALS

10: Battery wiring module
11: Housing
12: Module-side terminal
13: Wire
20: Wire accommodating portion
30, 40, 41: Terminal accommodating portion
51, 52, 53: First elastic joining portion
54: Second elastic joining portion forming a blocking wall portion
23, 24: Recess
B: Bus bar
C: Battery cell
S1, S2: Gap

What is claimed is:

1. A battery wiring module comprising:
module-side terminals that are electrically connected to bus bars connecting battery terminals of a plurality of battery cells;
wires with ends on one side connected to the module-side terminals; and
a housing to accommodate the wires and the module-side terminals,
wherein the housing includes:
a wire holder that includes a bottom and sidewalls extending from the bottom, and the wire holder routes the wires through a space at least partially contained by the bottom and the sidewalls of the wire holder;
a plurality of terminal holders that include bottoms and sidewalls extending from the bottoms, and the terminal holders accommodate the module-side terminals in spaces at least partially contained by the bottoms and sidewalls of the terminal holders; and
first elastic joiners that directly connect the sidewalls of the wire holder and the sidewalls of the terminal holders in a direction in which the battery cells are aligned, in an elastically-deformable manner.

2. The battery wiring module according to claim 1, comprising second elastic joiners that join the terminal holders that are adjacent to each other in the direction in which the battery cells are aligned, in an elastically-deformable manner.

3. The battery wiring module according to claim 2, wherein the housing includes blocking wall portions that each block at least one of a gap between the wire holder and one of the terminal holders and a gap between the terminal holders that are adjacent to each other in the direction in which the battery cells are aligned.

4. The battery wiring module according to claim 3, wherein the second elastic joiners also serve as the blocking wall portions to block the gaps between the terminal holders that are adjacent to each other in the direction in which the battery cells are aligned.

5. The battery wiring module according to claim 1, wherein the housing includes blocking wall portions that each block at least one of a gap between the wire holder and one of the terminal holders and a gap between the terminal holders that are adjacent to each other in the direction in which the battery cells are aligned.

6. The battery wiring module according to claim 1, wherein the wire holder includes a plurality of recesses that are recessed in a direction that is orthogonal to the direction in which the plurality of battery cells are aligned, and that is orthogonal to a direction of stacking the housing on the battery cells, and the terminal holders are included in the recesses.

7. The battery wiring module according to claim 1, wherein the first elastic joiners each include an S-shaped structure.

* * * * *